(No Model.) 2 Sheets—Sheet 2.
A. R. PRITCHARD & J. M. SELLMAYER.
ABRADING MACHINE.
No. 560,862. Patented May 26, 1896.
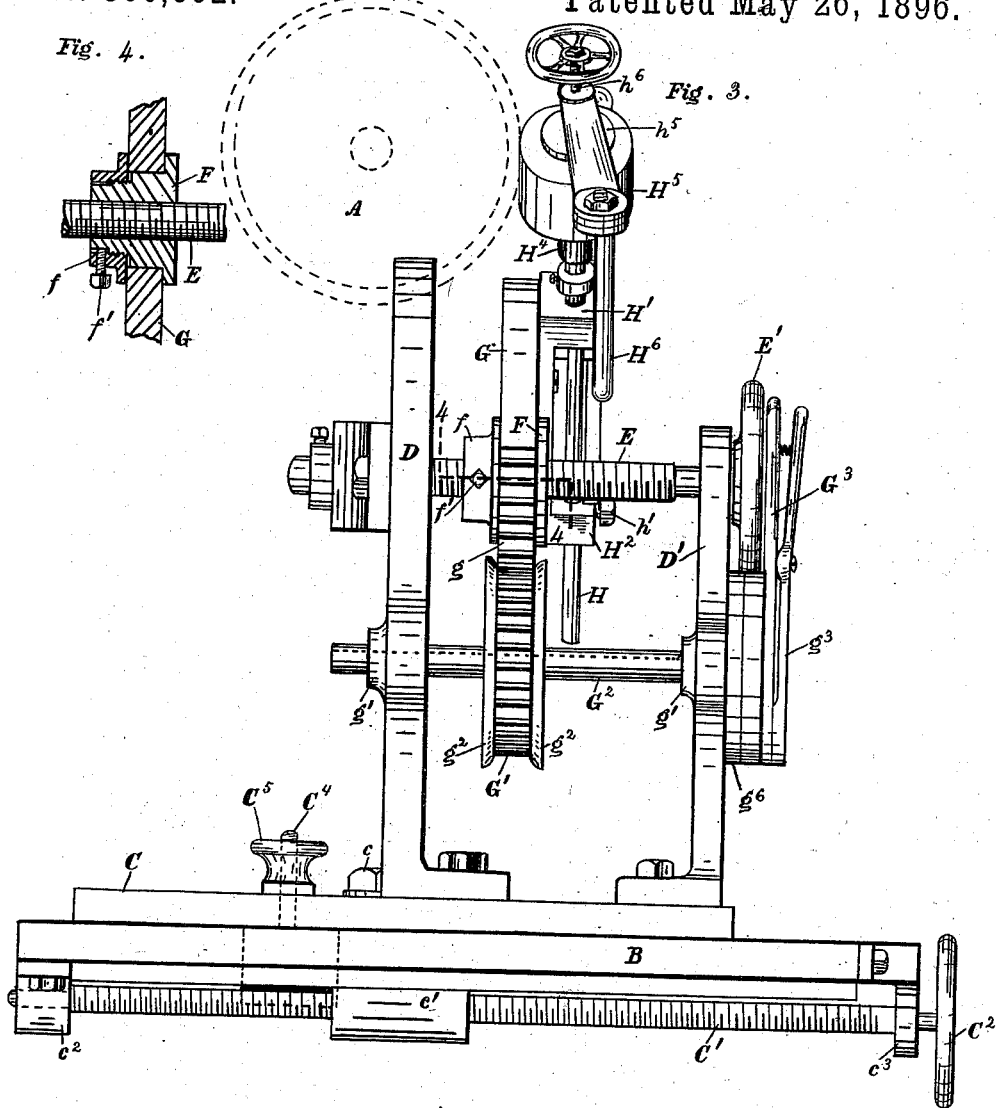
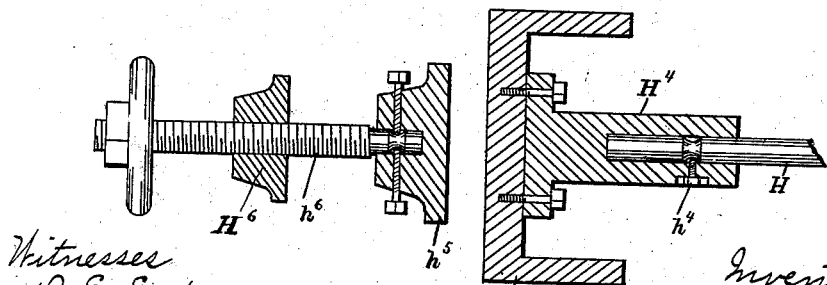

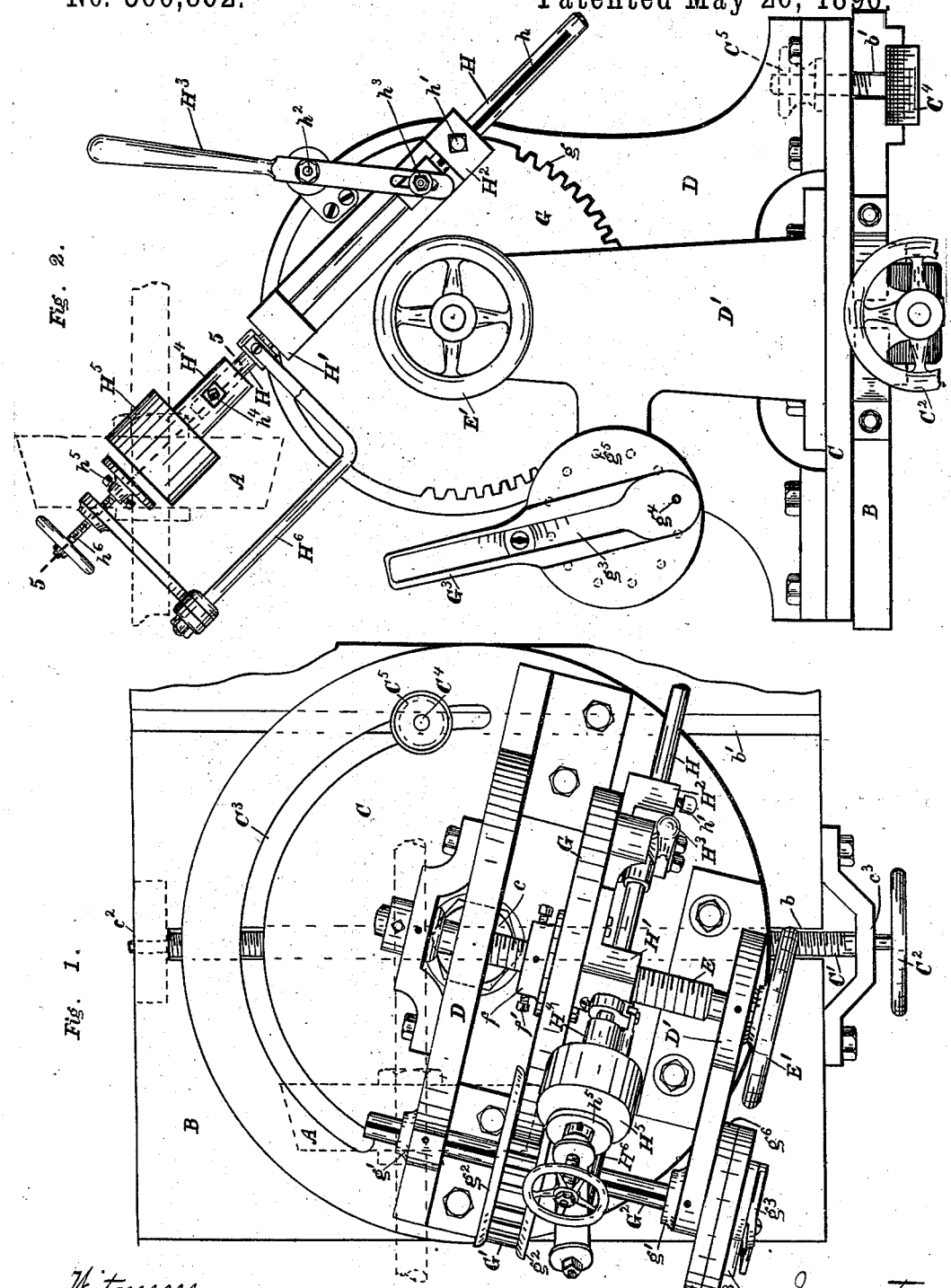

UNITED STATES PATENT OFFICE.

ALBERT R. PRITCHARD AND JOHN M. SELLMAYER, OF ROCHESTER, NEW YORK.

ABRADING-MACHINE.

SPECIFICATION forming part of Letters Patent No. 560,862, dated May 26, 1896.

Application filed September 14, 1895. Serial No. 562,581. (No model.)

*To all whom it may concern:*

Be it known that we, ALBERT R. PRITCHARD and JOHN M. SELLMAYER, citizens of the United States, and residents of the city of Rochester, in the county of Monroe and State of New York, have invented certain new and useful Improvements in Abrading-Machines, of which the following is a specification, reference being had to the accompanying drawings, in which—

Figure 1 is a top plan view of our device. Fig. 2 is a front elevation thereof. Fig. 3 is an end elevation thereof. Fig. 4 is a cross-section on the line 4 4 of Fig. 3, and Fig. 5 is a cross-section on the line 5 5 of Fig. 2.

The object of this invention is to provide a universally-adjustable work-support for machines for abrading or buffing; and said invention consists in the devices hereinafter described and claim.

The invention is shown as applied to the buffing of sheet-metal ware.

In the drawings, A is an abrading or buffing wheel of any suitable character, the same being shown in dotted lines in the respective figures. The buffing-wheel is set upon a suitable shaft arranged in bearings and is driven at a high rate of speed by any suitable mechanism for such a purpose, such as the usual pulley upon the shaft and a belt to a line-shaft.

A plate or table B supports the device and is itself supported by a suitable standard or other device in proper relation to the buffing-wheel A, and may be arranged on ways parallel to the shaft of the buffing-wheel. This table B is slotted transversely, as at $b$ and $b'$. Through the slot $b$ passes the stem of the center pivot $c$ of a secondary table C, capable of rotation in a substantially horizontal plane. This center pivot has a stem, which passes downward underneath the table B and has upon its end a nut $c'$. (See Fig. 3.) In this nut runs a screw $C'$, which can turn in fixed bearings $c^2$ $c^3$ and may be rotated by a hand-wheel $C^2$, whereby the rotary table C may be moved longitudinally in the line of the screw $C'$ to adjust the work in that direction with reference to the buffing-wheel. The table C has a curved slot $C^3$ drawn from the center of the table C as a radius. A bolt $C^4$ passes through the slot $C^3$ and through the slot $b'$ with an enlarged head underneath the table B. A nut $C^5$ serves to clamp the table C to the table B and at different angles with reference to the buffing-wheel A, and, since the slot $b'$ is parallel to the screw $C'$, the table C may be moved to and from the buffing-wheel and at the same time may be adjusted at different angles thereto, inasmuch as the bolt $C^4$ slides longitudinally in the slot $b'$. From the table C there rises a main supporting-bracket D and a second supporting-bracket $D'$. These two brackets support a screw E, set in a fixed plane, preferably parallel to the plane of the table C. The screw is provided with a hand-wheel $E'$ or other means of turning the screw. Upon this screw runs a threaded collar F, (see Fig. 4,) so that on turning the screw E the collar F runs backward and forward thereon. Upon the collar F turns the member or disk G for carrying the chuck-support hereinafter mentioned and which is held upon the collar by means of the nut $f$, provided with the set-screw $f'$. Hence while the nut F moves upon the screw E and carries with it the work-disk G the disk may turn in a substantially vertical plane about the collar F and independently thereof and is movable by the screw E along the line of the axis of rotation of the disk G. The work support or disk G has about a suitable portion of its periphery a series of gear-teeth $g$. These gear-teeth mesh into a pinion $G'$, which is splined upon a shaft $G^2$ parallel to the screw E and arranged in fixed bearings $g'$ in the brackets D $D'$.

The pinion $G'$ has side flanges $g^2$, which extend on each side of the teeth $g$, whereby whenever the disk G is moved by turning the screw E the pinion $G'$, by reason of the flanges $g^2$, will follow the position of the disk G. Upon the end of the shaft $G^2$ is a handle $G^3$, provided with a locking-lever $g^3$. The locking-lever has a pin $g^4$, which engages a series of holes $g^5$ in a disk $g^6$, stationary upon the bracket $D'$. Thus when the handle $G^3$ is turned the shaft $G^2$ is also turned, thereby turning the pinion $G'$, splined to said shaft, and thereby also turning the work-disk G to adjust the vertical angle of the work with reference to the buffing-wheel A and is locked in any position in which it may be set.

Upon the work support or disk G is carried the chuck support or rod H, in suitable fixed bearings H' H², upon said disk G, whereby the rod is movable in the line of the axis of the chuck. The rod H is splined, as at $h$, and a set-screw $h'$, in a bearing of the rod, permits its longitudinal movement in the bearings and prevents the same from turning. A hand-lever H³ is pivoted, as at $h^2$, to the disk G, and is also slotted at its end and pivoted to the rod H, as at $h^3$. On moving the lever H³ the rod H is moved longitudinally in its bearings. Upon the end of the rod H is a cap or head H⁴, having a socket to contain the end of the rod, so that the head H⁴ is capable of free revolution upon the rod. Suitable means, such as a set-screw $h^4$, holds the head upon the end of the rod. Upon the end of the head H⁴ is fastened a chuck or form H⁵ of suitable shape to support the sheet-metal vessel which is to be polished. The form H⁵ is fastened to the head H⁴ by suitable bolts, so as to be removable from the head and changed for another form when a vessel of another shape is to be polished. To the rod H is also fastened a bracket H⁶, extending around opposite to the end of the axis of the head H⁴ and form H⁵, and is there provided with a clamping device, such as the screw $h^6$, which bears upon the end nearest to the head H⁴ the disk $h^5$, which is fastened upon the end of the screw in such a manner as to be capable of free revolution. When a vessel is upon the form H⁵, the disk $h^5$ may be clamped down to hold the vessel upon the form without interfering with the free revolution of the vessel, together with the form H⁵ and head H⁴, although upon clamping the disk $h^5$ more tightly the revolution of the form H⁵ may be retarded, or may even be held stationary in order to grind or polish a particular part thereof. Interchangeable disks $h^5$ may be provided for work of different shapes and to correspond to the contour of the form H⁵. Hence the chuck support or rod H is carried by the disk G and table C, whereby said chuck-support is adjustable with reference to the abrading-wheel A by rotation in two intersecting planes at right angles with each other, and is also movable by the screw E along one of the axes of rotation.

As shown in the drawings, the buffing-wheel A is preferably made with a flexible edge, so as to enter the recesses of a vessel having an irregular surface, or to conform itself to the vessel which is to be polished.

Sheet-metal vessels are made either by drawing, in which case the striations upon the surface are parallel to the axis of the vessel on account of the direction in which it is pressed through the dies, or these vessels are made by spinning, in which case the striations are circumferential and at right angles to the grain of vessels produced by drawing.

By reason of its universal adjustability our device is adapted to hold the work at any angle with reference to the buffing-wheel in order to grind or polish along these striations or across them at any angle, as shown clearly in Fig. 2. If now the work is placed upon the form H⁵, on adjusting the table C to the proper angle by turning it and clamping the bolt C⁴, or by moving the table by means of the hand-wheel C² and adjusting the angle as just mentioned, the operator can then, according to the shape of the vessel to be polished, turn the handle G³, thus raising or lowering the work until it is adjusted in the right position, then move it directly toward the buffing-wheel A by turning the hand-wheel E', whereupon, as soon as the buffing-wheel begins to abrade the vessel, the form H⁵ and head H⁴ revolve upon the shaft H. In order to polish every portion of the vessel, the lever H³ is vibrated, and thus the work is moved across the edge of the buffing-wheel, bringing every portion of its surface in contact therewith. The disk $h^5$ is clamped down to hold the work upon the head, so that when the rod H is drawn backward there will be no possibility of pulling the work off the form, although ordinarily the very high speed of the buffing-wheel, as compared with the slower speed of revolution of the work, will keep the work upon the form. The speed of revolution of the head H⁴ may be diminished and adjusted to a nicety by clamping the disk $h^5$ to the proper degree. In order to polish the bottom of a vessel, the bracket H⁶ is swung out of the way, the disk C is turned upon its pivot, and the table B is moved with reference to the buffing-wheel A until the proper position is reached, whereupon the hand-wheel C² turns the screw C' and brings the bottom of the work into contact with the buffing-wheel, the angle of contact being adjusted by turning the handle G³.

It is obvious that the head H⁴ may be adapted to receive a chuck or other holding device, whereby to grasp and hold articles of any form which are to be polished, and also that the head H⁴, being capable of revolution as above mentioned, may be arranged to be moved positively by hand or by a power device, in order that the head shall revolve at any desired speed, either with or against the motion of the abrading-disk; and it is also obvious that this device may be used in combination with a buffing or abrading wheel, which is itself adjustable with reference to the work, according to the form or character of the work that is to be abraded.

This device provides means for universal adjustment of the work with reference to the buffing-wheel, so that the various corners and edges, beads, and other irregularities of contour may be presented to the buffing-wheel at the proper angle. It also provides means for moving the work across the buffing-wheel after having accurately adjusted the line in which it is desired that the same shall move, and there is thus provided an efficient easily-adjusted device, whereby a series of vessels may be ground or polished, and the rapidity of the operations may be increased to five or six times that of handwork.

We claim—

1. The combination in an abrading-machine, with an abrading-wheel, of a chuck, a chuck-support, devices for moving said chuck-support along the line of the axis of the chuck, and supporting devices for said chuck-support adjustable with reference to the abrading-wheel by rotation in two intersecting planes at suitable angles with each other and also movable along one of the axes of rotation.

2. The combination in an abrading-machine, with an abrading-wheel, of a chuck, a longitudinally-movable rod bearing said chuck, and supporting devices for said rod adjustable with reference to the abrading-wheel, by rotation in two intersecting planes at right angles with each other and also movable along one of the axes of rotation.

3. The combination in an abrading-machine, with an abrading-wheel, of a chuck, the longitudinally-movable rod bearing said chuck, a support for said rod consisting of a disk adjustable by rotation to turn said rod in a substantially vertical plane and provided with means, as a screw, for moving said disk along the line of the axis of its rotation, a frame supporting said disk and capable of adjustment in a substantially horizontal plane, whereby the said rod bearing said chuck is capable of adjustment with reference to the abrading-wheel, by rotation in two intersecting planes at right angles with each other and is movable along one of said axes of rotation.

4. The combination in an abrading-machine, with an abrading-wheel, of a chuck-support, a chuck mounted upon said support and capable of free revolution thereon, means for moving said chuck-support along the line of the axis of the chuck, a disk having bearings wherein said chuck-support moves in the manner aforesaid and capable of rotation in a substantially vertical plane, a screw engaging and moving said disk in the line of its axis of rotation, means for rotating said disk and fixing the same in different positions, whereby the vertical angular position of said chuck may be adjusted with reference to the abrading-wheel, and the disk is adjustable along the line of its axis, a supporting-frame having fixed bearings for said screw and capable of rotation in a substantially horizontal plane, and other means for moving said supporting-frame in one or more right lines.

5. The combination in an abrading-machine, with an abrading-wheel, of a chuck-support, a chuck mounted upon said support and capable of free revolution thereon, means for moving said chuck-support along the line of the axis of the chuck, a clamping device attached to said chuck-support and adapted to clamp against said chuck to hold the work thereupon, a disk having bearings wherein said chuck-support moves in the manner aforesaid and capable of rotation in a substantially vertical plane, a screw engaging and moving said disk in the line of its axis of rotation, means for rotating said disk and fixing the same in different positions, whereby the vertical angular position of said chuck may be adjusted with reference to the abrading-wheel, and the disk is adjustable along the line of its axis, a supporting-frame having fixed bearings for said screw and capable of rotation in a substantially horizontal plane, and other means for moving said supporting-frame in one or more right lines.

6. The combination in an abrading-machine, with an abrading-wheel, of a table C movable in a right line, as by the screw E and nut C' and capable of revolution about a center, as c, attached to the nut c', means of clamping the said table C in different angular positions, a supporting-frame upon said table, a screw, as E, in fixed bearings in said supporting-frame, a threaded collar F movable upon said screw, a segment or disk G capable of revolution upon said collar, means for turning said segment or disk G, as the shaft $G^2$ and pinion G' splined upon said shaft, engaging teeth upon said segment or disk G, a handle, as $G^3$, for operating said shaft and means for setting said handle in various angular positions, a chuck support or rod as H longitudinally movable in fixed bearings upon said segment or disk G, a handle as $H^3$, for moving said chuck support or rod, a head as $H^4$ capable of free revolution upon said chuck support or rod, a chuck as $H^5$ removably attached to said head $H^4$ and a clamping device as $h^5$ attached to and movable with said rod H for clamping the work upon said chuck, substantially as described.

7. The combination in an abrading-machine, with an abrading-wheel, of a chuck, a longitudinal movable rod bearing said chuck, a support for said rod consisting of a member adjustable by rotation to turn said rod in a substantially vertical plane and provided with means, as a screw, for moving said member along the line of the axis of its rotation, a frame supporting said member and capable of adjustment in a substantially horizontal plane, whereby the said rod bearing said chuck is capable of adjustment with reference to the abrading-wheel by rotation in two intersecting planes at right angles with each other and is movable along one of said axes of rotation.

8. The combination in an abrading-machine, with an abrading-wheel, of a chuck-support, a chuck mounted upon said support, means for moving said chuck-support along the line of the axis of the chuck, a clamping device attached to said chuck-support and adapted to clamp against said chuck to hold the work thereon, a rotating member having bearings wherein said chuck-support moves in the manner aforesaid and capable of rotation in a substantially vertical plane, a screw engaging and moving said rotating member in the line of its axis of rotation, means for rotating said member and fixing the same in different positions, whereby the vertical angular position of said chuck may be adjusted with reference to the abrading-wheel, and the rotating member is adjustable along the line of its axis, a supporting-frame having fixed bearings for said screw and capable of rotation in a substantially horizontal plane, and other means for moving said supporting-frame in one or more lines.

ALBERT R. PRITCHARD.
JOHN M. SELLMAYER.

Witnesses:
E. H. MARSELLUS,
S. P. MOORE.